US 11,258,912 B2

(12) United States Patent
Yamaguchi (10) Patent No.: US 11,258,912 B2
(45) Date of Patent: Feb. 22, 2022

(54) DOCUMENT CONVEYANCE APPARATUS, IMAGE READING APPARATUS, AND IMAGE FORMING APPARATUS

(71) Applicant: CANON KABUSHIKI KAISHA, Tokyo (JP)

(72) Inventor: Takuya Yamaguchi, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/165,731

(22) Filed: Feb. 2, 2021

(65) Prior Publication Data

US 2021/0243321 A1 Aug. 5, 2021

(30) Foreign Application Priority Data

Feb. 5, 2020 (JP) .............................. JP2020-018274

(51) Int. Cl.
*H04N 1/00* (2006.01)
*B65H 5/06* (2006.01)

(52) U.S. Cl.
CPC ......... *H04N 1/00732* (2013.01); *B65H 5/062* (2013.01); *H04N 1/00559* (2013.01);
(Continued)

(58) Field of Classification Search
CPC ........................ B65H 5/062; B65H 2511/51; B65H 2513/40; B65H 2513/512; B65H 2220/01; B65H 2220/02; B65H 2220/03; B65H 2220/11; B65H 2402/441; B65H 2403/22; B65H 2403/53; B65H 2403/721; B65H 2404/6111; B65H 2405/3321; B65H 2801/06; B65H 2801/39; B65H 3/0669; B65H 3/0684; B65H 3/34; B65H 3/56;
(Continued)

(56) References Cited

U.S. PATENT DOCUMENTS 8,322,710 B2 * 12/2012 Andoh ................. G03G 15/602
271/145
2011/0285078 A1 * 11/2011 Andoh ................. G03G 15/602
271/265.01
(Continued)

FOREIGN PATENT DOCUMENTS

JP 2015-196545 A 11/2015

*Primary Examiner* — Negussie Worku
(74) *Attorney, Agent, or Firm* — Canon U.S.A., Inc. I.P. Division (57) ABSTRACT

A document conveyance apparatus includes a loading portion having a loading surface for a document, a rotating member, a detection unit, a feeding roller, and a support portion. The rotating member includes a front end portion protruding from the loading surface and rotates about a rotary shaft by being in contact with the loaded document. The detection unit detects rotation of the rotating member and detects presence or absence of the loaded document. The feeding roller feeds the document by being in contact with the document loaded on the loading surface. The support portion rotatably supports the rotary shaft. When the rotary shaft is viewed from an axial direction, the rotary shaft includes a recessed portion recessed from an outer periphery section of the rotary shaft toward a shaft center of the rotary shaft. The support portion is in contact with the recessed portion to rotatably support the rotating member.

9 Claims, 11 Drawing Sheets

(52) U.S. Cl.
CPC ..... *H04N 1/00602* (2013.01); *H04N 1/00689* (2013.01); *H04N 1/00692* (2013.01)

(58) Field of Classification Search
CPC .. B65H 7/04; H04N 1/00559; H04N 1/00602; H04N 1/00689; H04N 1/00692; H04N 1/0073; H04N 1/00588; H04N 1/0062; H04N 1/00694; H04N 1/00734; H04N 1/00745; H04N 1/00755; H04N 1/00774; H04N 1/0473; H04N 2201/0471; H04N 2201/04725; H04N 2201/04731; H04N 1/00732
USPC ........................................................ 358/498
See application file for complete search history.

(56) References Cited

U.S. PATENT DOCUMENTS

| | | | |
|---|---|---|---|
| 2012/0025453 A1* | 2/2012 | Yamaguchi | B65H 85/00 271/225 |
| 2012/0262746 A1* | 10/2012 | Hanabusa | B65H 7/04 358/1.12 |
| 2015/0115519 A1* | 4/2015 | Takezawa | B65H 3/0669 271/117 |
| 2019/0193970 A1* | 6/2019 | Yamaguchi | B65H 3/06 |
| 2021/0243321 A1* | 8/2021 | Yamaguchi | H04N 1/00732 |
| 2021/0245981 A1* | 8/2021 | Suga | H04N 1/00559 |

\* cited by examiner

DOCUMENT CONVEYANCE APPARATUS, IMAGE READING APPARATUS, AND IMAGE FORMING APPARATUS

BACKGROUND

Field

The present disclosure relates to a mechanism that detects loaded documents, a document conveyance apparatus that separates and feeds the loaded documents one by one, an image reading apparatus that reads an image of the fed document, an image forming apparatus, and an image forming main apparatus including any of these apparatuses.

Description of the Related Art

In the related art, an image reading apparatus mounted on an image forming apparatus includes a document feeding apparatus that separates documents loaded on a loading tray for documents one by one and feeds the separated document.

In a sheet feeding apparatus, a sheet detection unit for detecting presence or absence of the sheet loaded on the loading tray is provided on the tray or near a feeding port. A sheet detection unit discussed in Japanese Patent Application Laid-Open No. 2015-196545 includes a rotating member that rotates while being in contact with the loaded sheet, and a detection sensor that detects rotation of the rotating member. The rotating member is rotated by a weight of the loaded sheet, and presence or absence of the sheet is detected by the detection sensor.

However, the sheet feeding apparatus used in recent years is required to feed various types of media, for example, a thin sheet, a thick sheet, a sheet having a narrow width such as a receipt or a business card, and a sheet having a wide width such as an A3 sheet. In a case where the thin sheet having the narrow width is set on the loading tray, the rotating member provided in the sheet detection unit may not be rotated because the weight of the sheet is small. In other words, in the case where the sheet is set on the loading tray, an end of the rotating member cannot be rotated to a detection position at which the detection sensor performs detection, and presence or absence of the sheet cannot be detected.

SUMMARY

It is desirable to provide a mechanism for feeding a document in a configuration that detects presence or absence of the document by rotation of a rotating member when the document is set on a loading tray, which can even detect a document of which weight is small.

According to an aspect of the present disclosure, a document conveyance apparatus includes a loading portion having a loading surface on which a document is to be loaded, a rotating member having a front end portion protruding from the loading surface and configured to rotate about a rotary shaft by being in contact with the document loaded on the loading surface, a detection unit configured to detect rotation of the rotating member and to detect presence or absence of the document loaded on the loading surface, a feeding roller configured to feed the document by being in contact with the document loaded on the loading surface, and a support portion configured to rotatably support the rotary shaft, wherein, when the rotary shaft is viewed from an axial direction, the rotary shaft includes a recessed portion recessed from an outer periphery section of the rotary shaft toward a shaft center of the rotary shaft, and wherein the support portion is configured to be in contact with the recessed portion to rotatably support the rotating member.

Further features of the present disclosure will become apparent from the following description of exemplary embodiments (with reference to the attached drawings).

DESCRIPTION OF THE EMBODIMENTS

An exemplary embodiment of the present disclosure is described below with reference to drawings. Dimensions, materials, shapes, etc. of components described in the following exemplary embodiment may be changed depending on a configuration of an apparatus to which the present disclosure is applied and various kinds of conditions, and an application range of the present disclosure is not limited to the described dimensions, materials, shapes, etc.

<Image Forming Main Apparatus>

Figure 1:
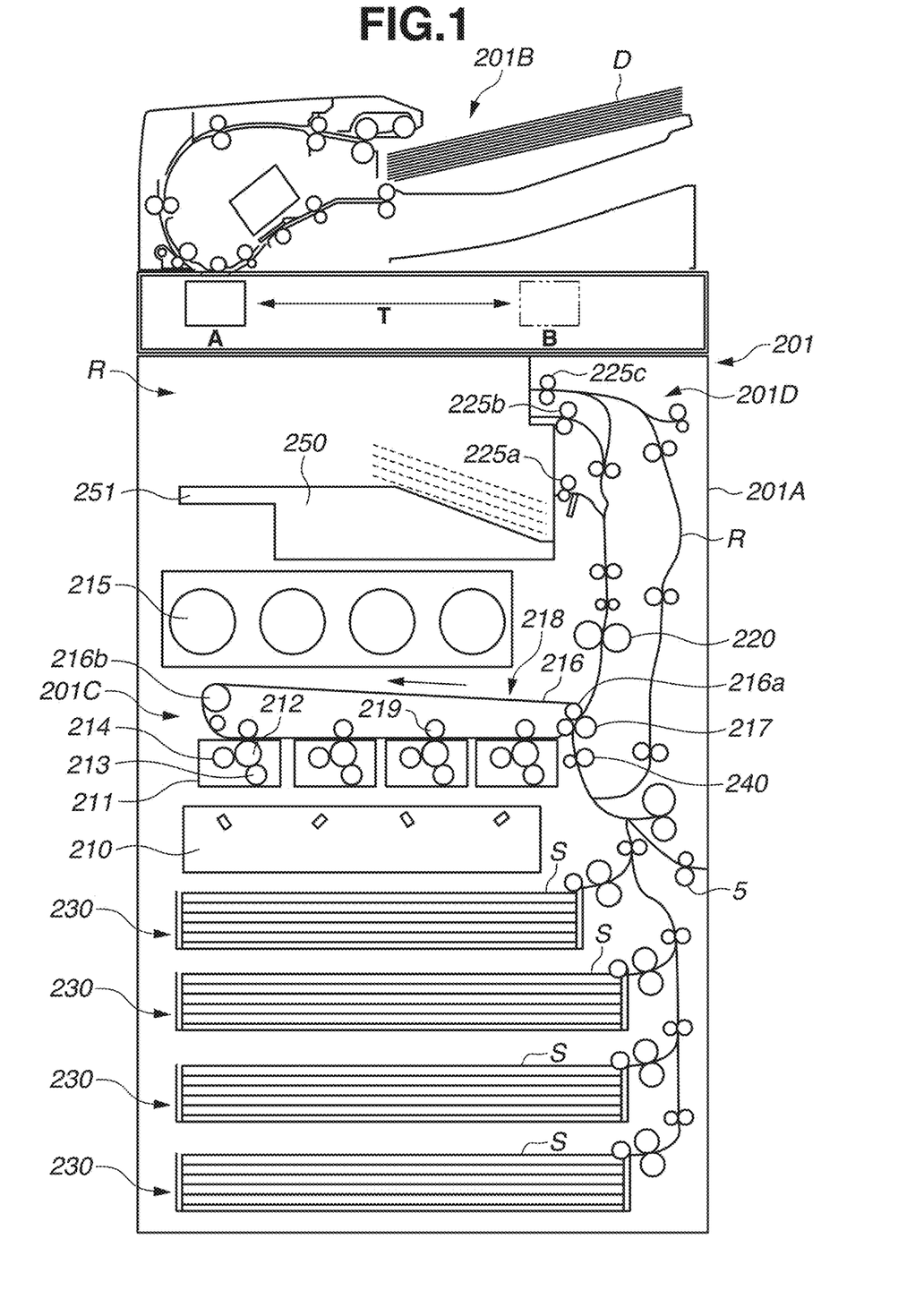
FIG. 1 is a cross-sectional view illustrating an image forming main apparatus according to an exemplary embodiment of the present disclosure.

FIG. 1 is a cross-sectional view illustrating an image forming main apparatus according to an exemplary embodiment of the present disclosure. In FIG. 1, an image forming main apparatus 201 includes an image forming apparatus 201A that forms an image, and an image reading apparatus 201B that is disposed on top of the image forming apparatus 201A and reads an image of a document. A sheet conveyed by the image forming apparatus 201A is a sheet S, and the document conveyed by the image reading apparatus 201B is a document D.

First, the image forming apparatus 201A is described. The image forming apparatus 201A includes an image forming unit 201C and a sheet conveyance unit 201D. The image forming unit 201C employs a four-drum full-color system, and includes a laser scanner 210, and process cartridges 211 to form toner images of four colors of yellow, magenta, cyan, and black. Each of the process cartridges 211 includes a photosensitive drum 212, a charger 213, and a developing device 214 for performing development, and forms each toner image. The image forming unit 201C further includes, above the process cartridges 211, an intermediate transfer unit 218, a fixing portion 220, and toner cartridges 215 that supplies toner to the respective developing devices 214.

The intermediate transfer unit 218 includes an intermediate transfer belt 216, primary transfer rollers 219, a driving roller 216a, and a tension roller 216b. The intermediate transfer belt 216 rotates in an arrow direction in FIG. 1. At a position facing the driving roller 216a of the intermediate transfer unit 218, a secondary transfer roller 217 that constitutes a secondary transfer portion that transfers a color image formed on the intermediate transfer belt 216 to the sheet S, is provided. The fixing portion 220 is disposed above the secondary transfer roller 217 and fixes the toner images on the sheet S on which the color image has been transferred.

Next, the sheet conveyance unit 201D is described. A feeding device 230 is disposed below the image forming unit 201C. The feeding device 230 feeds sheets P loaded in a plurality of cassettes, one by one. The sheet S fed by the feeding device 230 is adjusted its timing by a registration roller 240 and is conveyed toward the secondary transfer portion where the toner images are transferred to the sheet S. The sheet S on which the toner images have been transferred is conveyed to the fixing portion 220, and the toner images are fixed to the sheet S by the fixing portion 220. A first discharge roller pair 225a, a second discharge roller pair 225b, and an inversion roller pair 225c are disposed above the fixing portion 220. In a case where the toner images are printed on only one side of the sheet S, the sheet S is conveyed by the first discharge roller pair 225a or the second discharge roller pair 225b and is discharged to a discharge tray 250. The discharge tray 250 includes a discharge extension tray 251 that can be appropriately extended. As a result, it is possible to prevent deterioration of loading property such as falling of the discharged sheet S to outside the image forming apparatus 201A. Meanwhile, in a case where images are to be printed on both sides of the sheet S, the sheet S is conveyed by the inversion roller pair 225c. Then, the sheet S is switched back by forward rotation and reverse rotation of the inversion roller pair 225c so that a leading end and a trailing end of the conveyed sheet S are switched. The switched-back sheet S passes through a double-sided conveyance path R and is conveyed to the registration roller 240 again, and an image is formed on a back surface of the sheet S.

As described above, the image formation by the image forming unit 201C and the series of sheet conveyance operation by the sheet conveyance unit 201D are interlinked. As a result, an image is formed on the sheet S, and the sheet S on which the image has been formed is discharged to the discharge tray 250.

<Image Reading Apparatus>

Figure 2:
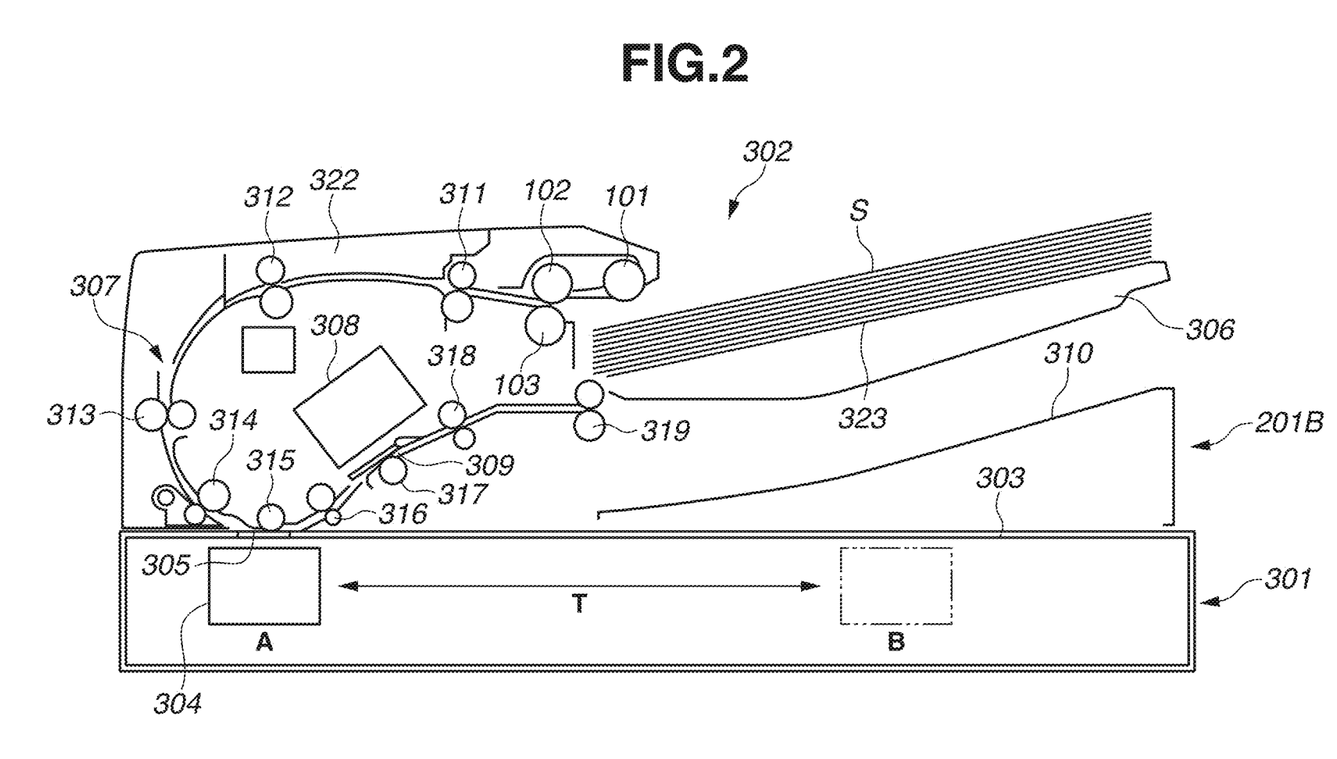
FIG. 2 is a cross-sectional view of an image reading apparatus according to an exemplary embodiment.
Figure 3:
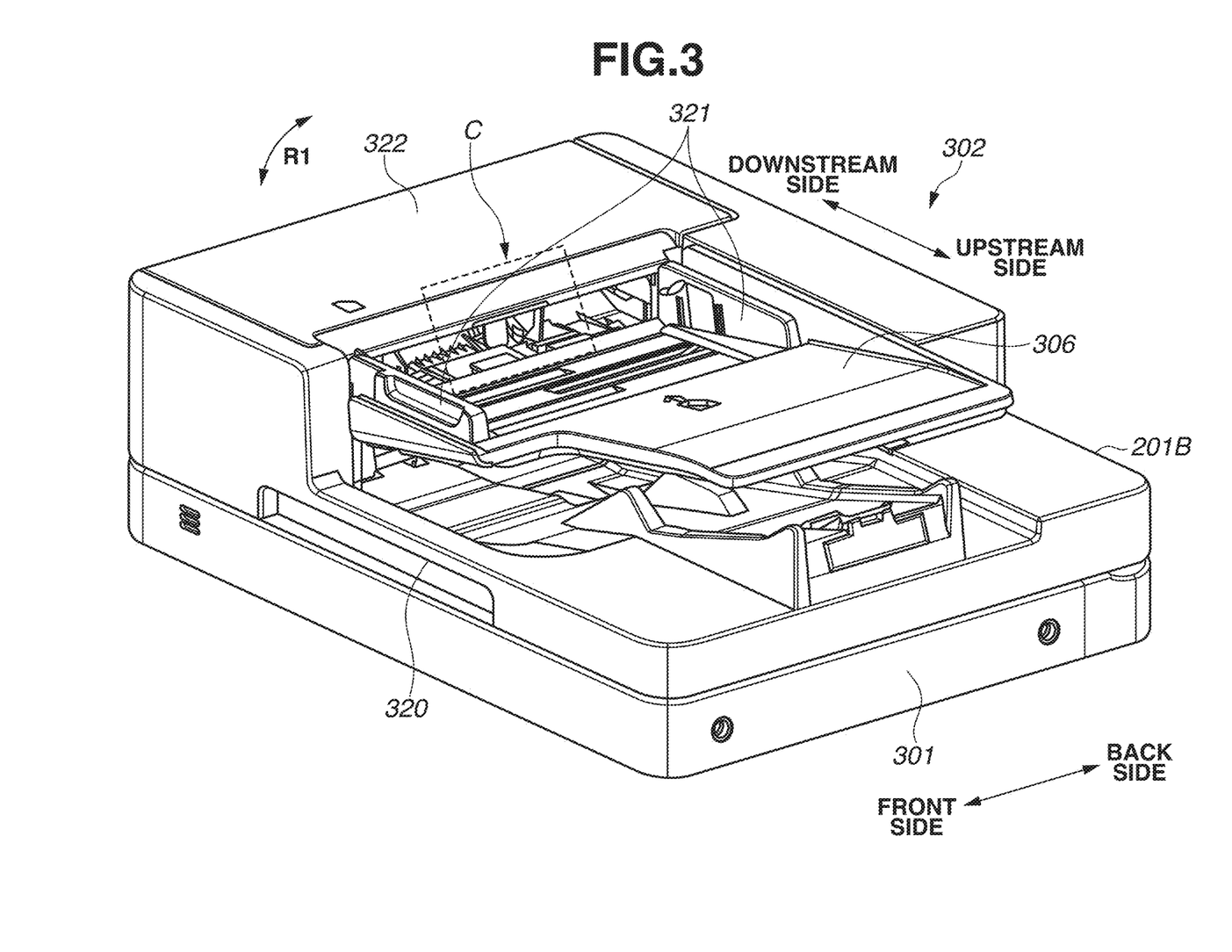
FIG. 3 is an appearance view of the image reading apparatus according to an exemplary embodiment.

Next, the image reading apparatus 201B is described in detail with reference to FIGS. 2 and 3. FIG. 2 is a cross-sectional view of the image reading apparatus 201B in FIG. 1. FIG. 3 is an appearance view of the image reading apparatus 201B. As illustrated in FIG. 2, the image reading apparatus 201B includes a reader unit 301 that reads a document and a document conveyance apparatus (auto document feeder (ADF)) 302 that conveys the document to the reader unit 301 and then discharges the document. It should be noted that, in an embodiment, there may exist a paper path between the document conveyance apparatus 302 located in the apparatus 201B and the image forming unit 201C in the image forming apparatus 201A so that the document conveyance apparatus 302 can feed a sheet to the image forming unit 201C, though the paper path is not illustrated in FIGS. 1 and 2.

There are two modes of reading the image of the document by the image reading apparatus 201B. A first mode is a "feeding-document reading mode" in which the image is read while the document is conveyed, and a second mode is a "document fixed reading mode" in which the document to be read is placed on an original platen 303 and an image of the document is read. Each of the reading methods is described below.

First, the second mode, the "document fixed reading mode" is described. As described above, to perform the document fixed reading mode, it is necessary to place the document to be read on the original platen 303. As illustrated in FIG. 3, a hinge (not illustrated) is provided to the original platen 303 on a back side of an apparatus main body, and the document conveyance apparatus 302 is openable/closeable in an R1 direction by lifting a handle portion 320 from the reader unit 301.

In a state where the document conveyance apparatus 302 is opened relative to the reader unit 301, the document to be read is placed on the original platen 303. Then, the opened document conveyance apparatus 302 is closed, and reading is started. As illustrated in FIG. 2, a first image reading unit 304 for reading the image is provided inside the reader unit 301 below the original platen 303. The first image reading unit 304 is provided to be movable from a position A to a position B in an arrow T direction (sub-scanning direction) on a rail (not illustrated) provided inside the reader unit 301. In other words, the first image reading unit 304 can read the document D placed on the original platen 303 by moving in the sub-scanning direction relative to the placed document D.

Next, the "feeding-document reading mode" is described. To perform the feeding-document reading mode, the document conveyance apparatus (automatic document feeder (ADF)) 302 is used. As illustrated in FIG. 2 and FIG. 3, the document conveyance apparatus 302 includes a document tray 306 that is a loading portion on which the document D is loaded onto a loading surface 323. Side regulation plates 321 that regulate a position of the document D in a width direction are slidably provided on the document tray 306. The side regulation plates 321 regulate the position in the width direction of the document D loaded on the document tray 306, so that the document D is conveyed while the position thereof is aligned in the width direction when the document D is conveyed.

A feeding cover 322 that opens and closes a document conveyance path of the ADF 302 is provided above the leading end of the document D loaded on the document tray 306. The feeding cover 322 includes a pickup roller 101 as a feeding roller. The pickup roller 101 is moved downward by a feeding motor as a driving source (not illustrated) and comes in contact with the document D. Then, the pickup roller 101 is rotated by the feeding motor (not illustrated) to feed the document D toward the image reading units 304, 308.

As illustrated in FIG. 2, the pickup roller 101 is normally retracted into a home position that is a separated position separated upward from the document D so as not to obstruct loading of the document D on the document tray 306 by the user. To feed the document D loaded on the document tray 306, the pickup roller 101 is lowered from the separated position and is moved to a document feeding position where the pickup roller 101 comes in contact with an upper surface of the document D. Then, when the pickup roller 101 is rotated, the document D is conveyed to a separation portion provided on a downstream side in a document feeding direction. The separation portion is a nip portion formed by a feed roller 102 as a conveyance roller and a retard roller 103 as a separation member. The feed roller 102 is a roller that conveys the document D fed by the pickup roller 101 to the downstream side in the document feeding direction. The retard roller 103 is a roller that comes into press contact with the feed roller 102 and separates a document fed by the pickup roller 101 from a bundle into a single document D.

The separated document D is conveyed by a drawing roller pair 311 disposed on the downstream side in the document conveyance direction of the feed roller 102. The document D conveyed by the drawing roller pair 311 is further conveyed to a registration roller pair 313 by a conveyance roller pair 312. The registration roller pair 313 temporarily stops, and causes the leading end of the document D to abut on a nip portion of the registration roller pair 313, thereby bending the document D and correcting skew of the leading end of the document D. Bending of the document D that is made when the skew of the leading end of the document D is corrected is housed inside a loop space 307. Further, a first read roller pair 314, a first platen roller 315, a second read roller pair 316, a second platen roller 317, a third read roller pair 318, and a discharge roller pair 319 are provided in order on the downstream side of the registration roller pair 313.

The skew-corrected document D is conveyed by the first read roller pair 314 to a front surface image reading position on a first platen glass 305. At the front surface image reading position, an image on a first surface that is a front surface of the document D is read by the first image reading unit 304 provided in the reader unit 301 as described above while the document D is conveyed. At this time, the first image reading unit 304 is stopped at the position A illustrated in FIG. 2. The document D from which the image of the front surface has been read is sent to a second platen glass 309 by the second platen roller 317, and an image of a back surface of the document D is read by the second image reading unit 308. In other words, in the case where the feeding-document reading mode is performed, the images of the front and back surfaces of the document D can be read by the first image reading unit 304 and the second image reading unit 308 at the same time. In other words, the first image reading unit 304 reads the image of the front surface of the document D conveyed by the document conveyance apparatus 302, and the second image reading unit 308 reads the image of the back surface of the document D conveyed by the document conveyance apparatus 302. After the image of the back surface is read by the second image reading unit 308, the document D is discharged to a discharge tray 310 by the third read roller pair 318 and the discharge roller pair 319.

As described above, the document conveyance apparatus 302 can read the image of the document D while conveying the document D. Each of the documents D loaded on the document tray 306 can be automatically and successively sent to, and read by, the reading units 304 and 308. The pickup roller 101 is maintained at the document feeding position in contact with the document D during a job, and rises at the time when the job ends.

<Configuration of Feeding Portion in Document Conveyance Apparatus>

Figure 4:
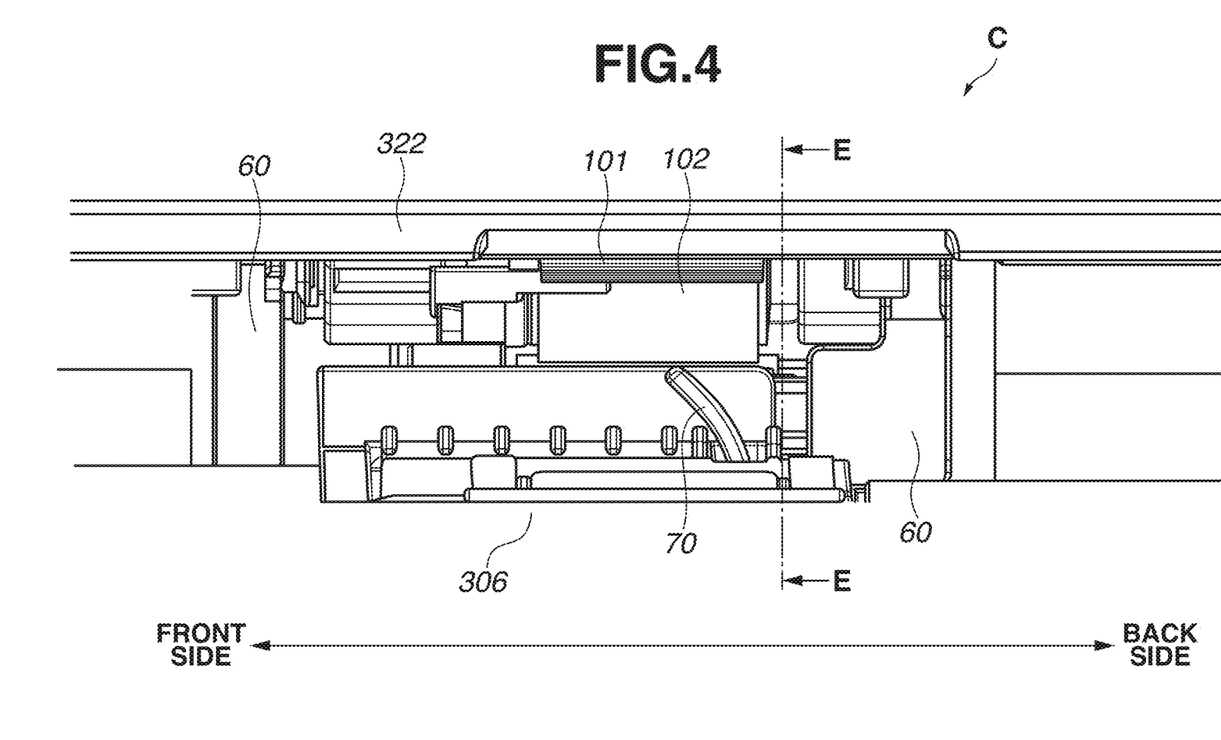
FIG. 4 is a side view of a feeding portion of a document conveyance apparatus according to an exemplary embodiment.
Figure 5:
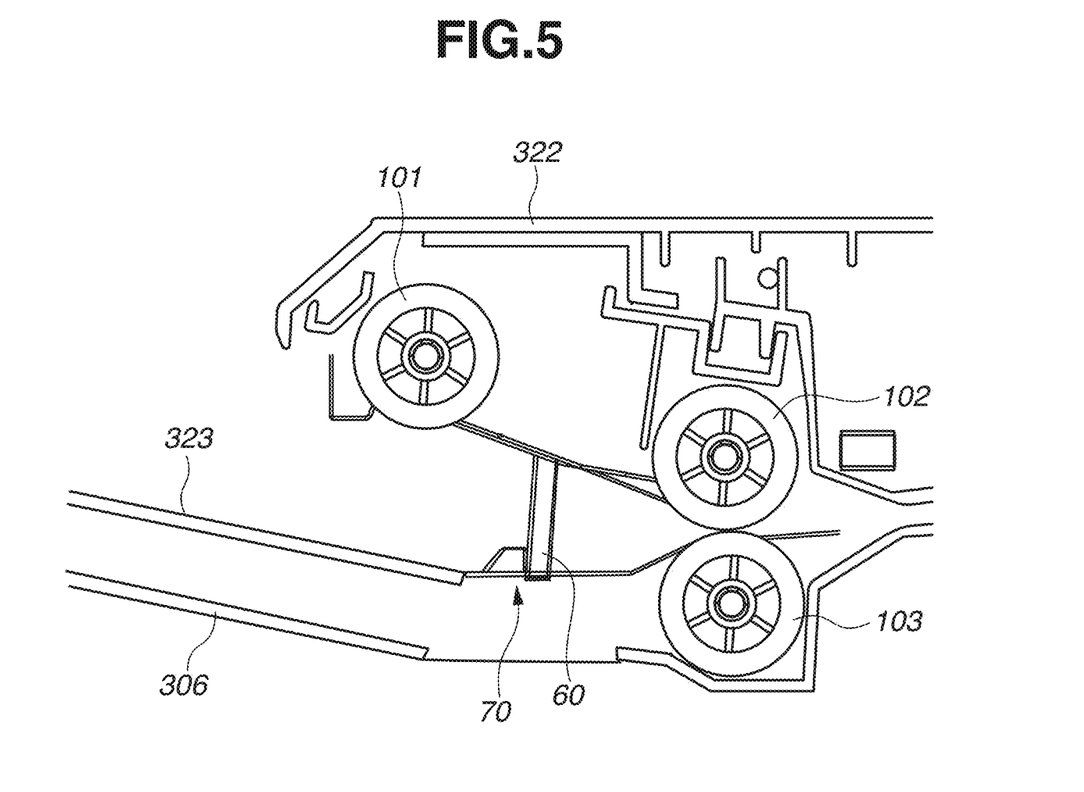
FIG. 5 is a cross-sectional view of the feeding portion of the document conveyance apparatus according to an exemplary embodiment.

Next, a feeding portion in the document conveyance apparatus 302 is described with reference to FIGS. 4 and 5. FIG. 4 is a diagram illustrating a feeding portion C at which the document is fed from the document tray 306 in FIG. 3. FIG. 5 is a diagram taken along a line E-E in FIG. 4.

The feeding cover 322 includes the pickup roller 101 that feeds the document D, and stoppers 60 that are leading end regulating members that regulate the leading end of the document D when the document D is loaded on the document tray 306. The document tray 306 further includes a document detection unit 70 that detects presence or absence of the loaded document.

First, as illustrated in FIG. 4, the stoppers 60 are provided at two positions on a front side and a back side with the pickup roller 101 in between in a document width direction orthogonal to the feeding direction in which the document D is fed. As a result, the leading end of the set document D abuts on the stoppers 60 at two positions, which makes it possible to reduce skew of the document that is set. As illustrated in FIG. 5, each of the stoppers 60 is provided between a position where the pickup roller 101 comes in contact with the loaded document and the nip portion of the feed roller 102 and the retard roller 103 in the feeding direction in which the document is fed. Thus, when the document D abuts on the stoppers 60, the leading end of the document D does not abut on the nip portion of the feed roller 102 and the retard roller 103. The stoppers 60 are each maintained at positions illustrated in FIG. 5 when the pickup roller 101 is at the separated position, and the stoppers 60 are released when the pickup roller 101 is at the document feeding position. The leading end of the document D fed by the pickup roller 101 pushes up the released stoppers 60, and the document D is fed.

Next, the document detection unit 70 that detects the document set on the document tray 306 is described. As with the above-described stoppers 60, the document detection unit 70 is also disposed at a substantially center in the width direction orthogonal to the feeding direction in which the document is fed.

Figure 6A:
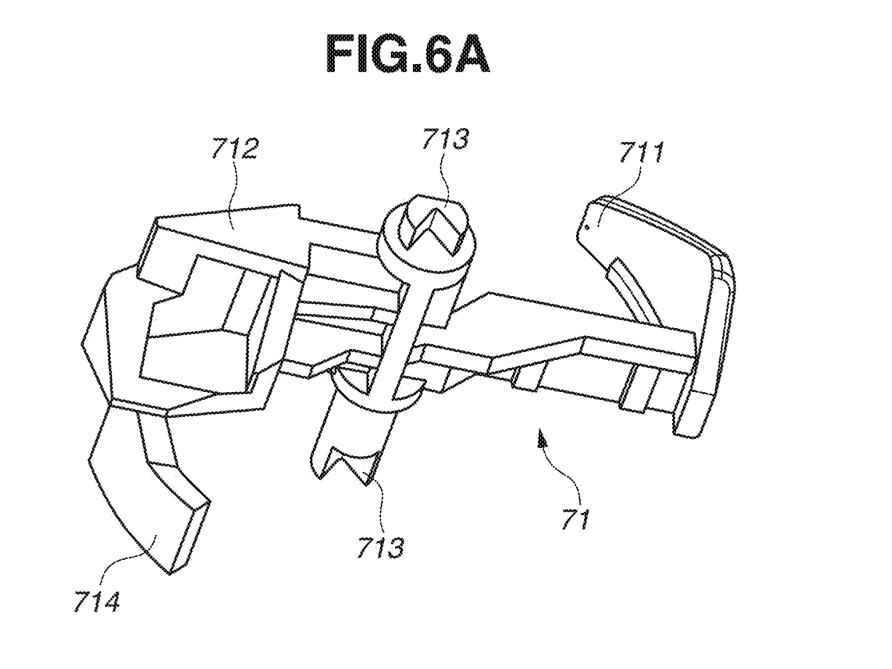
FIG. 6A is a first appearance view of components of a document detection unit according to an exemplary embodiment.
Figure 6B:
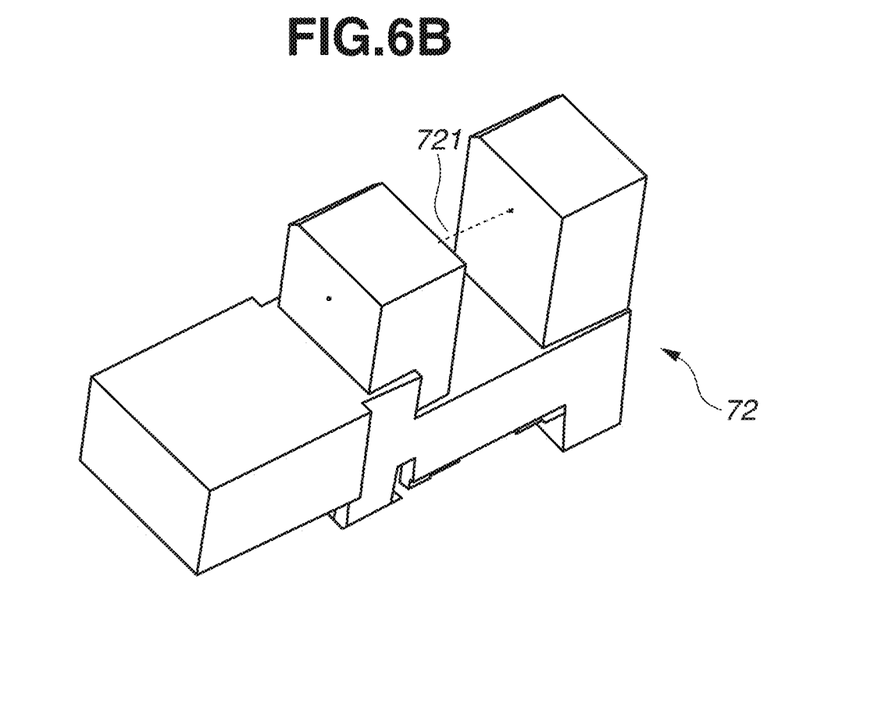
FIG. 6B is a second appearance view of the components of the document detection unit according to an exemplary embodiment.

FIGS. 6A and 6B illustrate components of the document detection unit 70. FIG. 6A is an appearance view of a flag 71 as a rotating member. FIG. 6B is an appearance view of a document detection sensor 72 that is a detection portion that detects rotation of the flag 71. As illustrated, the flag 71 includes an abutting portion 711 that is a front end portion abutting on the document loaded on the tray, a weight portion 712, a shaft portion 713 as a rotary shaft, and a blocking portion 714 that blocks an optical axis 721 of the document detection sensor 72. In the present exemplary embodiment, a photosensor that is an optical transmission type sensor is employed as the document detection sensor 72.

Figure 7A:
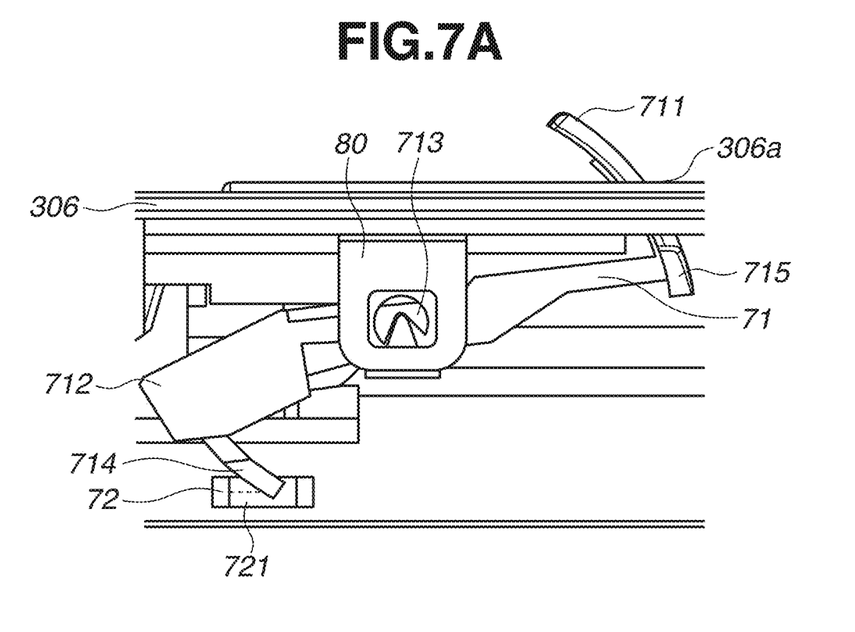
FIG. 7A is a first cross-sectional view illustrating operation of a rotating member of the document detection unit according to an exemplary embodiment.
Figure 7B:
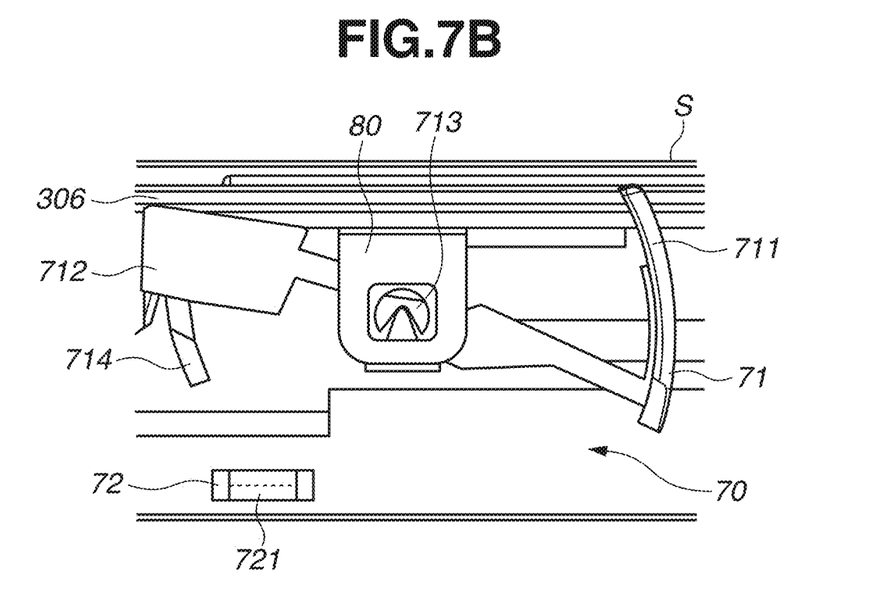
FIG. 7B is a second cross-sectional view illustrating the operation of the rotating member of the document detection unit according to an exemplary embodiment.

FIGS. 7A and 7B are cross-sectional views illustrating operation of the flag 71 of the document detection unit 70 in FIG. 4. FIGS. 7A and 7B are diagrams in a cross-sectional direction orthogonal to an axial direction of the shaft portion 713 of the flag 71. FIG. 7A illustrates a state of the flag 71 before the document D is loaded on the document tray 306. FIG. 7B illustrates a state of the flag 71 after the document D is loaded on the document tray 306.

The document tray 306 includes support portions 80 rotatably supporting the shaft portion 713 of the flag 71 at two positions in the document feeding direction. The flag 71 is rotatably supported in a cross-section orthogonal to the document feeding direction. One end of the flag 71 is provided with the abutting portion 711 that abuts on the document, and the other end of the flag 71 is provided with the weight portion 712 and the blocking portion 714 that blocks the optical axis 721 of the document detection sensor 72. The flag 71 is rotatable about the shaft portion 713. In a case where the document D is not set on the document tray 306, the abutting portion 711 is urged by a weight of the weight portion 712 so as to protrude from a loading surface of the document tray 306. At this time, a light beam of the document detection sensor 72 is blocked by the blocking portion 714 of the flag 71 (FIG. 7A). A slit 306a, provided on the loading surface of the document tray 306, is a hole from which the abutting portion 711 of the flag 71 protrudes upward from the loading surface. Further, a contact portion 715 provided in the abutting portion 711 comes into contact with a bottom surface (not illustrated) of the document tray 306 on a side opposite to the loading surface thereof, and accordingly, the flag 71 is stopped at a predetermined position. In a case where the document D is set on the document tray 306, the document D presses the abutting portion 711, and the flag 71 is rotated about the shaft portion 713. When the flag 71 is rotated, the blocking portion 714 provided in the flag 71 allows the light beam of the document detection sensor 72 to travel. As a result, it is detected that the document D has been set (FIG. 7B).

In the present exemplary embodiment, as illustrated in FIG. 5, the pickup roller 101, the flag 71, the stoppers 60, and the feed roller 102 are provided in order from the upstream side in the document feeding direction. In other words, the abutting portion 711 of the flag 71 is provided between the position where the leading end of the document abuts on the stoppers 60 and a position where the pickup roller 101 comes in contact with the document. Thus, when the document D is set on the document tray 306 so that the leading end of the document D abuts on the stoppers 60, the document D is detectable by the document detection unit 70.

<Method of Supporting Rotating Member of Document Detection Unit>

Figure 8A:
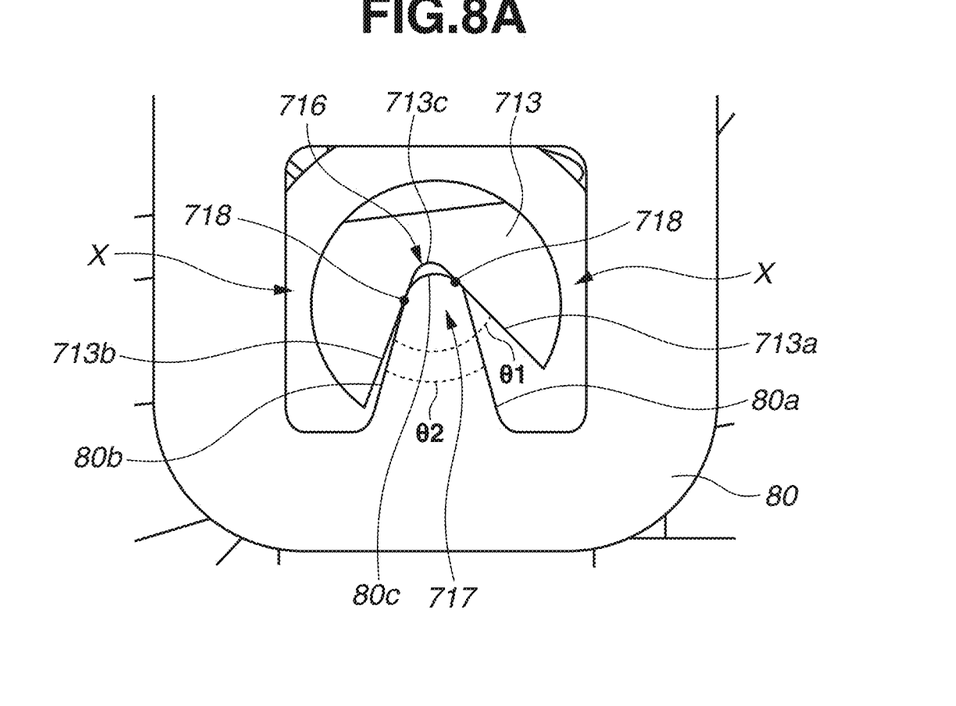
FIG. 8A is a first cross-sectional view illustrating a rotary shaft of the rotating member according to an exemplary embodiment.
Figure 8B:
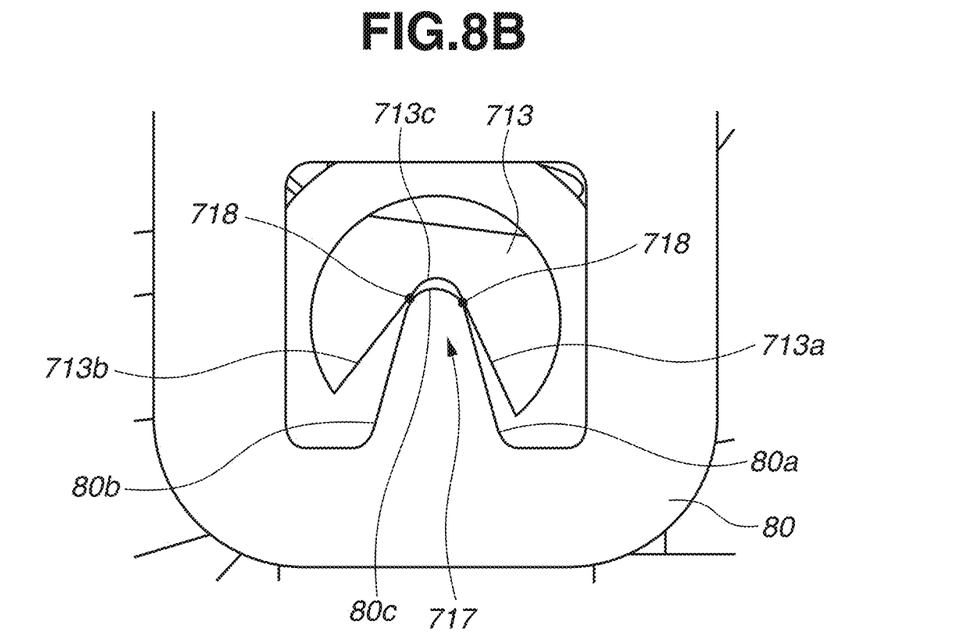
FIG. 8B is a second cross-sectional view illustrating the rotary shaft of the rotating member according to an exemplary embodiment.

Next, the flag 71 and the support portions 80 supporting the shaft portion 713 of the flag 71 are described with reference to FIGS. 8A and 8B that illustrate the shaft portion 713 of the flag 71 of FIGS. 7A and 7B in an enlarged manner. FIG. 8A illustrates the shaft portion 713 before the document D is set on the document tray 306. FIG. 8B illustrates the shaft portion 713 after the document D is set on the document tray 306.

As illustrated, the shaft portion 713 of the flag 71 includes a recessed portion 716. The recessed portion 716 includes a shaft side first planar section 713a as a first planar section, a shaft side second planar section 713b as a second planar section, and a shaft side arc section 713c as a first arc section. Each of the support portions 80 includes a projecting portion 717. The projecting portion 717 includes a support side arc section 80c as a second arc section, a support side first planar section 80a as a third planar section, and a support side second planar section 80b as a fourth planar section. The support side arc section 80c has a curvature set to be smaller than a curvature of the shaft side arc section 713c. In other words, the flag 71 is rotatably supported by the first planar section 713a and the second planar section 713b of the flag 71 coming into contact with the support side arc section 80c. When an angle formed by the first planar section and the second planar section is θ1 and an angle formed by the third planar section and the fourth planar section is θ2, the angle θ1 is larger than the angle θ2.

In FIGS. 8A and 8B, two support positions where the support portion 80 and the shaft portion 713 come into contact with each other are indicated by black dots. In the present exemplary embodiment, a center position of the shaft side arc section 713c and a center position of the support side arc section 80c are arranged to be substantially coincident with each other. The flag 71 is configured to be rotatable relative to the center of the support side arc section 80c. The support positions (black dots 718) where the support portion 80 and the shaft portion 713 of the flag 71 contact with each other are positioned on an upper side of a lowermost position of an outer periphery section of the shaft portion 713. In other words, the recessed portion 716 of the shaft portion 713 is supported so as to sandwich the support portion 80.

Further, a gap X is provided between the outer periphery section of the shaft portion 713 and an inner periphery section of the support portion 80. The outer periphery section of the shaft portion 713 does not contact the support portion 80 during rotation of the flag 71. On the other hand, the inner periphery section of the support portion 80 functions as a guide member of the shaft portion 713 in order to prevent the shaft portion 713 of the flag 71 from falling off from the support portion 80. If the sufficient gap X is not provided, the outer periphery section of the shaft portion 713 and the inner periphery section of the support portion 80 come into contact with each other during the rotation of the flag 71, which increases sliding resistance.

<Mechanism for Reducing Sliding Resistance of Rotating Member>

Figure 9:
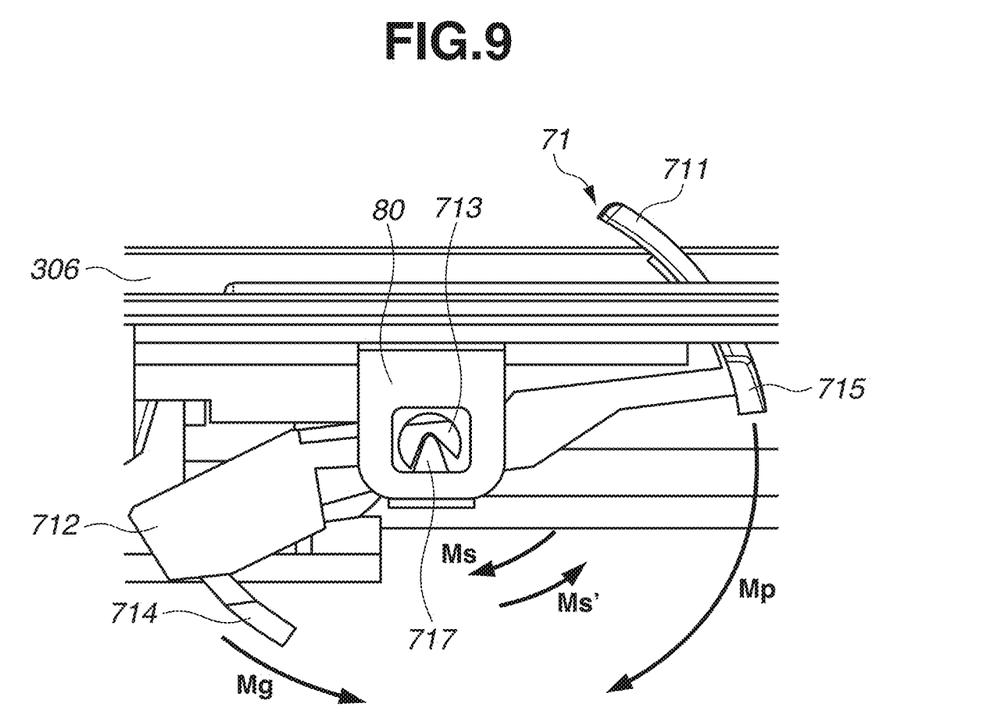
FIG. 9 is a diagram illustrating moments acting on the rotating member according to an exemplary embodiment.
Figure 10A:
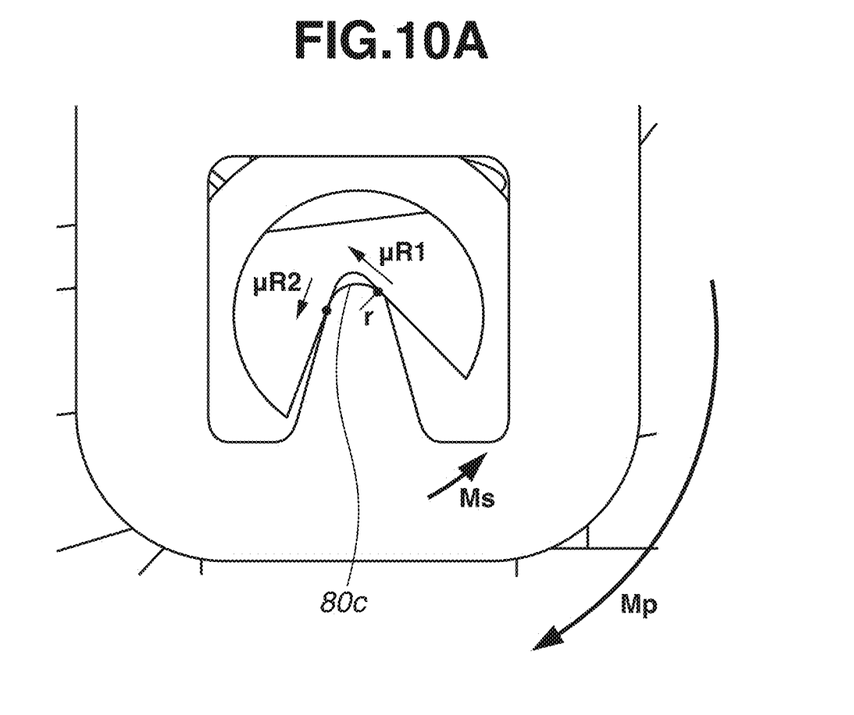
FIG. 10A is a diagram illustrating moments in an exemplary embodiment.
Figure 10B:
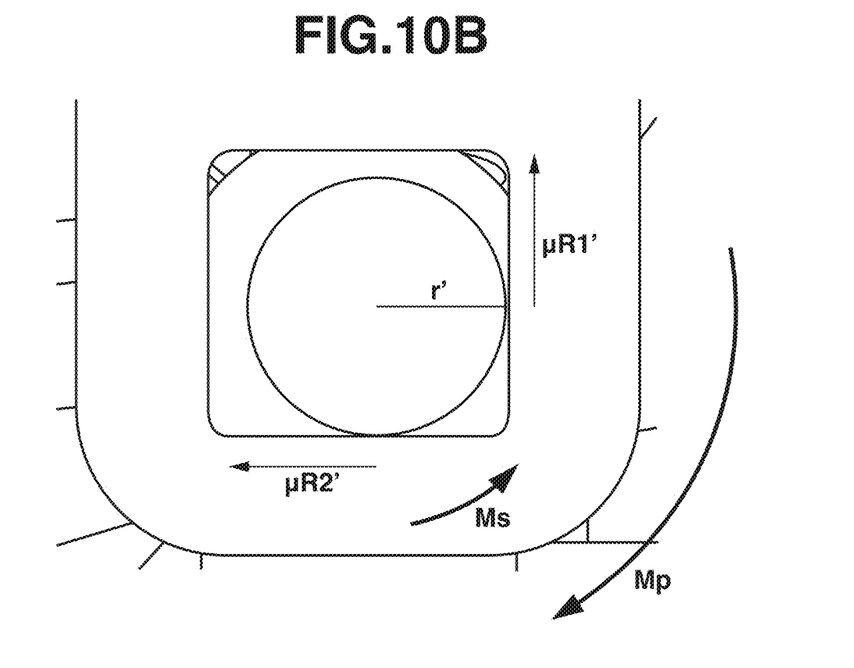
FIG. 10B is a diagram illustrating moments in a comparative configuration.
Figure 11A:
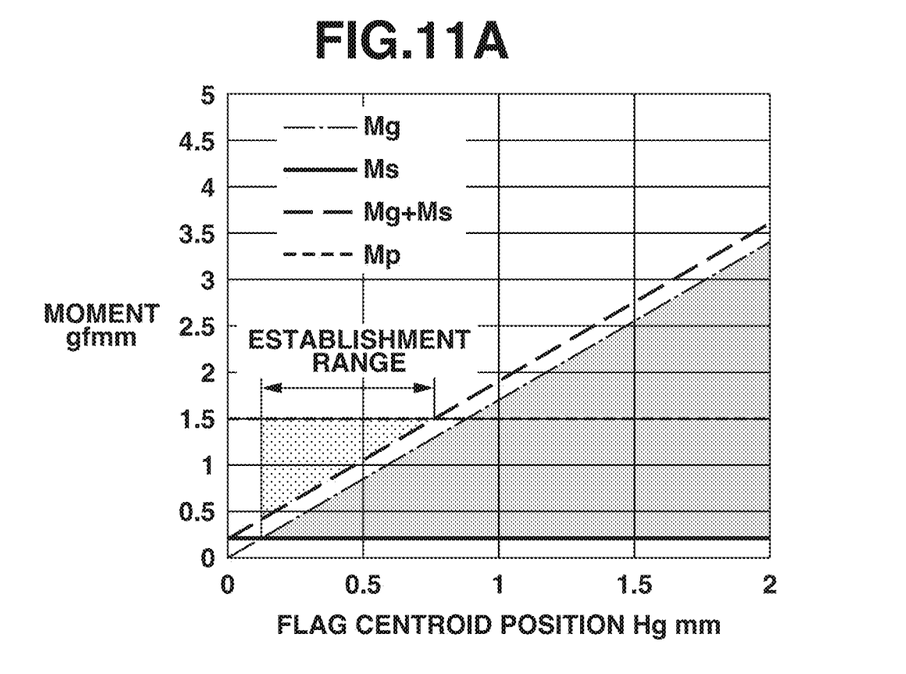
FIG. 11A is a graph illustrating the moments in an exemplary embodiment.
Figure 11B:
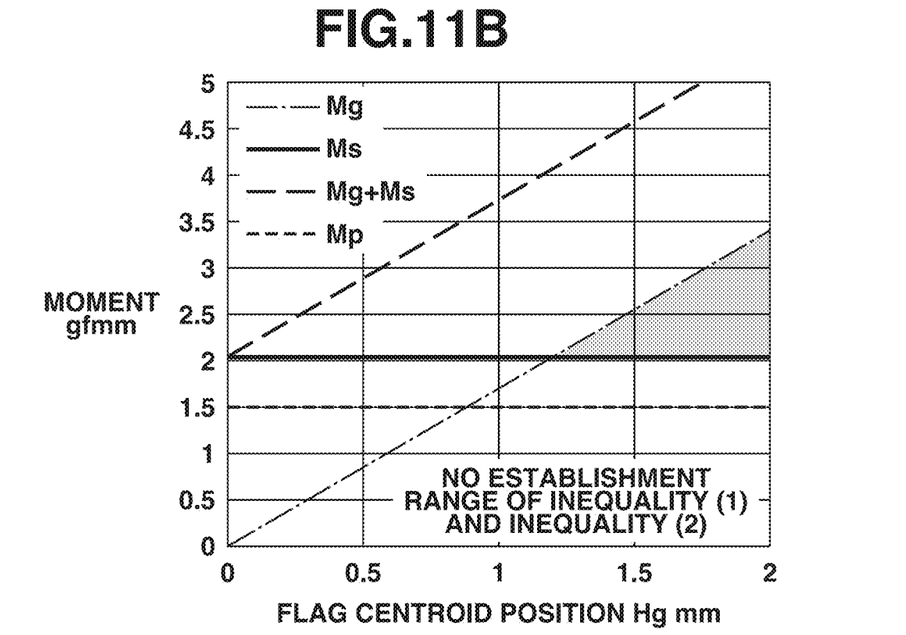
FIG. 11B is a graph illustrating the moments in the comparative configuration.

Next, a mechanism for reducing the sliding resistance that acts on the shaft portion 713 of the flag 71 and each of the support portions 80 in the present exemplary embodiment is described with reference to FIG. 9, FIG. 10A, FIG. 10B, FIG. 11A, and FIG. 11B. More specifically, description is given by focusing on rotation moments that act on the flag 71. FIG. 9 illustrates moments that act on the flag 71. FIGS. 10A and 10B are diagrams illustrating moments that act on the shaft portion 713 of the flag 71. FIGS. 11A and 11B are graphs illustrating the moments in FIGS. 10A and 10B.

First, as illustrated in FIG. 9, a moment Mg by the own weight of the weight portion 712 acts on the flag 71 supported by the support portions 80 with the shaft portion 713 as a fulcrum. A moment Ms by friction force at the shaft portion 713 acts as a reaction against the moment Mg by the own weight. The moment Mg by the own weight and the moment Ms by the friction force at the shaft portion 713 are required to satisfy a relationship of the following inequality, $$Mg > Ms \tag{1}$$

In other words, the moment Mg by the own weight is set to be larger than the moment Ms by the friction force. The condition is necessary for the abutting portion 711 of the flag 71 to protrude from the loading surface of the tray and for the blocking portion 714 of the flag 71 to block the optical axis 721 of the document detection sensor 72 when a document D is set. The contact portion 715 provided in the abutting portion 711 comes into contact with the bottom surface of the document tray 306, and accordingly, the flag 71 is stopped at the predetermined position.

Next, the document D is set on the document tray 306, and the abutting portion 711 is pushed down by the own weight of the document D. In this case, a moment Mp by the own weight of the document D occurs with the shaft portion 713, as a lever, supported by the projecting portion 717, as a fulcrum, and pivots on the fulcrum. When the moment Mp by the weight of the document D becomes larger than the moment Mg by the own weight, a moment Ms' by the friction force at the shaft portion 713 occurs in a direction opposite to a direction in which the flag 71 rotates with the shaft portion 713 as a lever. The moment Ms and the moment Ms' are forces having the same magnitude and acting in opposite directions, and each act in a direction opposite to an operation direction. Hereinafter, the moment Ms' is described as the moment Ms. At this time, the condition to detect the document D when the document D is loaded on the document tray 306 is required to satisfy a relationship of the following inequality, $$Mp > Mg + Ms \tag{2}$$

In other words, the moment Mp by the weight of the document D that acts when the document D is set is larger than a sum of the moment Mg by the own weight of the flag 71 and the moment Ms by the friction force at the shaft portion 713. This allows the flag 71 to rotate by the document D, allows the light beam of the optical transmission type sensor 72 to travel, and to detect that the document D has been set.

As described above, to assuredly return the flag 71 to a standby position, it is necessary to satisfy the inequality (1): Mg>Ms. To assuredly detect the document by the flag 71, it is necessary to satisfy the inequality (2) Mp>Mg+Ms. If the moment Mg is larger than the moment Mp, the document D receives a reaction force from the abutting portion 711 in an up-arrow direction, and the document D may become a shape waving upward with the abutting portion 711 as a starting point. As a result, the blocking portion 714 cannot allow the optical axis 721 of the document detection sensor 72 to travel, and the document D cannot be detected. Thus, it is determined that the document D is absent, even though the document D is loaded. In particular, in the case of a thin document having a narrow width such as a receipt, the moment Mp by the weight of the document D tends to be much smaller than the moment Mp by a regular document. For example, in the present exemplary embodiment, a weight of a regular document (A6R, 80 gsm) applied to the flag 71 is 0.34 g, whereas a weight of the thin document having the narrow width (58×85 mm, 37 gsm) is 0.02 g. Thus, to satisfy both of the inequalities (1) Mg>Ms and (2) Mp>Mg+Ms, reduction of the moment Ms by the friction force at the shaft portion 713 is the most important.

Next, the reduction of the moment Ms by the friction force at the shaft portion 713 is described while the configuration in the present exemplary embodiment and a configuration in a comparative example are compared. FIG. 10A illustrates the configuration in the present exemplary embodiment, and FIG. 10B illustrates the configuration in the comparative example. The configuration in the comparative example of FIG. 10B is a commonly used configuration in which the flag, having a circular shaft portion, is supported.

In FIG. 10A, when the flag 71 tries to rotate in the direction of the moment Mp by the weight of the document, the moment Ms by the friction force at the shaft portion 713 acts. The moment Ms by the friction force at the shaft portion 713 is represented by the following formula, $$Ms = r \times (\mu R1 + \mu R2), \tag{3}$$

where r is a radius of the support side arc section 80c, R1 and R2 are normal reactions applied from the support portion 80 to the shaft portion 713, and μ is the friction force.

The friction force μ is a value determined by materials contacting each other, and the normal reaction R1 and the normal reaction R2 are values substantially determined by the own weight of the flag 71. Thus, the moment Ms by the friction force at the shaft portion 713 is determined by the radius r of the support side arc section 80c.

In contrast, the moment Ms by the friction force of the flag in the configuration of the comparative example is represented by the following formula, $$Ms = r' \times (\mu R1' + \mu R2'), \tag{4}$$

where r' is the radius of the shaft portion, R1' and R2' are normal reactions applied from the support portion to the shaft portion, and μ is the friction force.

As with the expression (3), Ms=r×(μR1+μR2), the friction force μ in expression (4) is a value determined by the materials contacting each other, and the normal reaction R1' and the normal reaction R2' are values substantially determined by the own weight of the comparative example flag. Thus, the moment Ms by the friction force at the shaft portion is determined by the radius r' of the comparative example shaft portion.

In the formula (3), the radius r of the support side arc section 80c can be infinitesimally small. For example, in the case of mass production, the radius r can be reduced to about 0.1 mm. In contrast, for example, in the case of mass production, the radius r' of the shaft portion in the formula (4) is limited to about 1.5 mm in terms of molding. This is because a certain thickness is necessary to maintain the strength of the shaft portion of the comparative example flag. Thus, the radius r of the support side arc section 80c can be reduced to about 1/15 of the radius r' of the comparative example shaft portion. As a result, the moment Ms by the friction force at the shaft portion 713 can also be reduced to 1/15. In actuality, as described above, the weight of the regular document (A6R, 80 gsm) applied to the flag 71 is 0.34 g, whereas the weight of the thin document having the narrow width (58×85 mm, 37 gsm) is 0.02 g. In the present exemplary embodiment, it is possible to detect a thin document having a narrow width.

FIGS. 11A and 11B are graphs of the various kinds of moments in the configuration of the present exemplary embodiment and in the configuration of the comparative example. FIG. 11A is the graph in the configuration of the present exemplary embodiment, and FIG. 11B is the graph in the configuration of the comparative example. FIGS. 11A and 11B illustrate results of verification whether an area satisfying the inequality (1) and the inequality (2) is present in the case of the regular document having the width of 58 mm, the length of 85 mm, and the weight of 64 gsm. More specifically, verification whether the area satisfying the conditions represented by the inequality (1) and the inequality (2) is present is performed with a centroid position Hg of the flag 71 on a horizontal axis when the flag 71 has the same weight.

In FIGS. 11A and 11B, an area satisfying the inequality (1) is represented by a grey solid area, and an area satisfying the inequality (2) is represented by a dotted area. In FIGS. 11A and 11B, Mg and Mp are respectively a moment by the own weight of the flag and a moment by the own weight of the document D, and both indicate the same value in both drawings. The moments Ms and Mg+Ms that are moments by the friction at the shaft part are varied depending on the configuration of the shaft portion 713. The moment Ms is 0.25 gfmm in the configuration of FIG. 11A, whereas the moment Ms is 2 gfmm in the configuration of FIG. 11B. It is confirmed that there is about 10 times difference.

In the configuration of the present exemplary embodiment, the graph in FIG. 11A conveys that an establishment range of the flag centroid position satisfying the inequality (1) Mg>Ms and the inequality (2) Mp>Mg+Ms is present because the moment Ms by the friction force at the shaft portion 713 is small. In contrast, in the configuration of the comparative example, it is known from the graph in FIG. 11B that the inequality (1) and the inequality (2) cannot be satisfied at the same time because the moment Ms by the friction force at the comparative example shaft portion is large. In the configuration of FIG. 11B, the area satisfying the condition of the inequality (2) is no longer present, and the centroid position of the comparative example flag cannot be set.

As in the present exemplary embodiment, when the shaft portion 713 of the flag 71 is supported by the support portions 80, the sliding resistance can be reduced. Thus, when a document is loaded on the document tray 306, the flag 71 can be assuredly rotated, and the document D can be detected. In the present exemplary embodiment, the shaft portion 713 has the recessed portion 716 and each of the support portions 80 has the projecting portion 717; however, the configuration of the present disclosure is not limited thereto. The similar effects are achievable in a configuration in which the shaft portion 713 has a projecting portion, and each of the support portions 80 has a recessed portion. While the flag 71 of the document conveyance apparatus 302 has been described in the present exemplary embodiment, the exemplary embodiment is also applicable to an image reading apparatus having the document conveyance apparatus and a sheet feeding apparatus of another image forming apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-018274, filed on Feb. 5, 2020, which is hereby incorporated by reference herein in its entirety.

What is claimed is:

1. A document conveyance apparatus comprising:
a loading portion having a loading surface on which a document is to be loaded;
a rotating member having a front end portion protruding from the loading surface and configured to rotate about a rotary shaft by being in contact with the document loaded on the loading surface;
a detection unit configured to detect rotation of the rotating member and to detect presence or absence of the document loaded on the loading surface;
a feeding roller configured to feed the document by being in contact with the document loaded on the loading surface; and
a support portion configured to rotatably support the rotary shaft,
wherein, when the rotary shaft is viewed from an axial direction, the rotary shaft includes a recessed portion recessed from an outer periphery section of the rotary shaft toward a shaft center of the rotary shaft, and
wherein the support portion is configured to be in contact with the recessed portion to rotatably support the rotating member.

2. The document conveyance apparatus according to claim 1,
wherein, when the rotary shaft is viewed from the axial direction, the recessed portion of the rotary shaft includes a first arc section, a first planar section extending from one end of the first arc section, and a second planar section extending from the other end of the first arc section,
wherein the support portion includes a second arc section having a curvature smaller than a curvature of the first arc section, a third planar section extending from one end of the second arc section, and a fourth planar section extending from the other end of the second arc section, and
wherein the rotating member is supported by the support portion by the second arc section being in contact with the first planar section and the second planar section.

3. The document conveyance apparatus according to claim 2, wherein, when the rotary shaft is viewed from the axial direction, positions where the second arc section are in contact with the first planar section and the second planar section are positioned on an upper side of a lowermost position of the outer periphery section of the rotary shaft.

4. The document conveyance apparatus according to claim 2, wherein, when the rotary shaft is viewed from the axial direction, a center position of the first arc section and a center position of the second arc section are substantially coincident with each other.

5. The document conveyance apparatus according to claim 1, wherein the outer periphery section of the rotary shaft does not come in contact with the support portion while the rotating member is rotated.

6. The document conveyance apparatus according to claim 1, wherein the rotating member is disposed on the loading portion in such a manner that the axial direction of the rotary shaft extends along a document feeding direction.

7. The document conveyance apparatus according to claim 1, further comprising a leading end regulating member configured to regulate a position of a leading end of the document loaded on the loading surface,
wherein, in a document feeding direction, a position of the front end portion of the rotating member is provided between a position where the leading end of the document abuts on the leading end regulating member and a position where the feeding roller and the document are in contact with each other.

8. An image reading apparatus comprising:
the document conveyance apparatus according to claim 1; and
a reading unit configured to read an image of a document fed by the document conveyance apparatus.

9. An image forming apparatus, comprising:
the document conveyance apparatus according to claim 1; and
an image forming unit configured to form an image on a document fed by the document conveyance apparatus.

* * * * *